Nov. 30, 1926.                                                    1,609,271
              R. H. BEAUMONT ET AL
        MATERIAL HANDLING APPARATUS AND SYSTEM
                   Filed Feb. 7, 1925
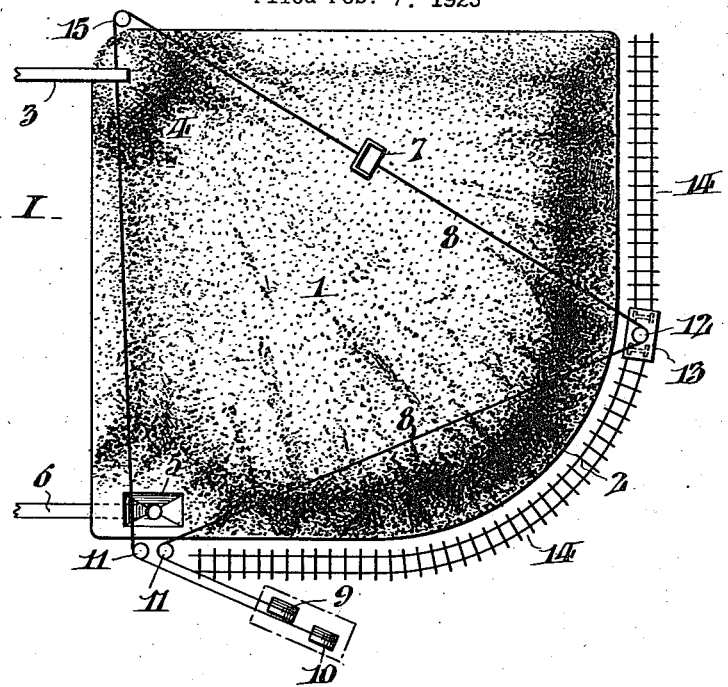
FIG. I.
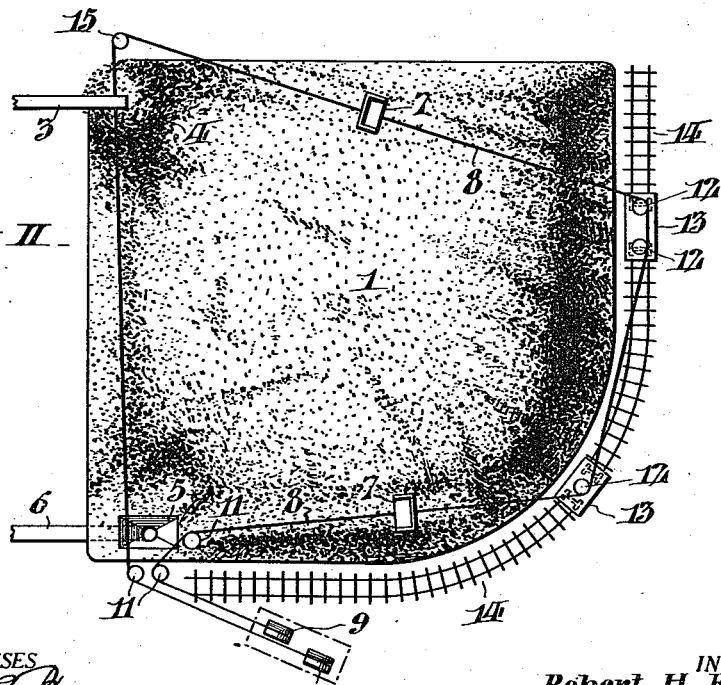
FIG. II.
WITNESSES
INVENTOR:
Robert H. Beaumont
& William E. Hale,
BY
ATTORNEYS.

Patented Nov. 30, 1926.

1,609,271

UNITED STATES PATENT OFFICE.

ROBERT H. BEAUMONT, OF RADNOR, AND WILLIAM E. HALE, OF FORT WASHINGTON, PENNSYLVANIA, ASSIGNORS TO R. H. BEAUMONT CO., OF PHILADELPHIA, PENNSYLVANIA, A CORPORATION OF PENNSYLVANIA.

MATERIAL-HANDLING APPARATUS AND SYSTEM.

Application filed February 7, 1925. Serial No. 7,510.

Our invention relates to the handling and storage of bulk materials, such as coal, broken stone, sand, gravel, etc., and is particularly concerned with systems or plants where the material is spread out over a substantial area or field for storage and subsequently reclaimed as wanted. For such purposes, the so-called drag scraper system is very widely used.

As thus applied, the drag scraper system comprises a scraper bucket or drag attached to a cable operated by power-driven winding drums. In general, these drums are located adjacent the edge of the field, near a "focal point" where the material is received and initially discharged upon the storage area. From one drum, the cable extends out across the field to a pulley sheave at its further boundary; thence to another such sheave a short distance away along the boundary; thence back to the other drum. The drag is attached to the cable between one of the drums and the corresponding sheave, so that by operating the drums in one direction or the other, the drag can be drawn back and forth across the field. The drag takes the material from the initial pile, and by a simple scraping or hoeing action carries it out and distributes it over the storage area, or vice-versa. The drag is so shaped that it scrapes the material in one direction and slides idly over it in the other; hence all that is necessary to adapt the apparatus for reclaiming after it has been employed for distributing (or vice-versa) is to reverse the drag on the cable.

The guide sheaves above mentioned are attached to posts at the edge of the field. Such posts are provided every 20 feet or thereabout all the way along the edge of the field, so that the whole area of the field may be covered by shifting the guide sheaves from one post to another; but as the sheaves and the cable are quite heavy, this is a somewhat laborious and tedious operation. Such installations are also subject to various other drawbacks and limitations.

We aim to improve and simplify the operation and construction of such systems; to increase their flexibility; to adapt them to operation from more than one focal point, and to receiving material for distribution and delivering reclaimed material at widely separated points, when desired; and to facilitate variation of the path of action of the drag or scraper to cover the storage area effectively. How these and various other advantages can be concurrently realized through our invention will appear from our description hereinafter of a selected and preferred embodiment.

In the drawing, Fig. I affords a diagrammatic plan view of an installation conveniently embodying our invention.

Fig. II is a fragmentary view similar to Fig. I, but illustrating modifications.

In the drawing, the storage area 1 is represented as a simple rectangle with one corner rounded as at 2,—though it will be understood, of course that in practice its shape may vary ad infinitum. The material to be stored may be supplied by any suitable means 3 to an initial pile 4, and the reclaimed material may be removed by any suitable means, such as a hopper 5 depressed below the level of the field and a conveyor 6 receiving the material from the bottom of the hopper. In the present instance, the delivering and receiving means, 3, 4 and 5, 6 are not side by side, at the same marginal focal point or station, but are widely separated,—being located, in fact, at different corners of the field 1 on one common side of its perimeter. The drag 7 is attached to a cable 8 operated by winding drums 9, 10. These drums 9, 10 may preferably be located adjacent one of the stations 4, 5,—as here shown, the receiving station or hopper 5. In the present instance, both of the drums 9, 10 are located to one side of the station 5, and the cable 8 extends from them around guide means conveniently located adjacent the station, such as pulley sheaves 11, 11. To enable the cable 8 and its drag 7 to cover the whole of the storage area, this cable 8 extends in a bight around guide means 12 (such as one or more pulley sheaves) movable around the field, along or adjacent its boundary. Preferably, however, this shiftable or "roving" guide means 12 is not mounted on any fixed post, as described above, but on a carriage 13 freely movable along the boudary, and here shown as a car on a track 14 that extends along the sides of the field perimeter adjacent and opposite that where the focal points 4, 5 are located.

Thus it can be progressively shifted with the utmost nicety and ease, to cover every portion of the field.

In order to avoid duplicate cable and drag equipments for the two stations 4, 5,—or, as an alternative, the necessity for shifting a single equipment about to operate from one station for distributing and from the other for reclaiming,—we prefer to reeve the cable 8 in a peculiar way. Instead of extending from both guide sheaves 11, 11 directly to the movable guide 12, the cable 8 extends from one of the sheaves 11 to guide means 15 (such as a pulley sheave) conveniently located at or adjacent the receiving station 4, and thence to the movable guide 12. As shown, the cable runs between the movable guide 12 and the respective stations 4, 5 diverge at a considerable angle,—sufficient to obviate the necessity of having very widely separated sheaves as the guide means 12 in order to prevent fouling of the drag 7 by the cable run to which it is not attached.

By attaching the drag 7 to the corresponding run of the cable 8, the material can be received and distributed from the station 4 or reclaimed and delivered at the station 5, as from time to time desired. This is practically just as easy as reversing the drag 7 on one and the same cable run, as heretofore; for all that is necessary is to shift the guide 12 enough to bring the desired cable run over the drag 7 as the latter lies on the field after being detached from the other run and turned around.

While, as pointed out above, the divergence of the cable runs forming the bight about the shiftable guide means 12 ordinarily dispenses with the provision of widely separated pulley sheaves for this guide means, such duplicate sheaves may, of course, be provided if desired: indeed, they may even be mounted on separate carriages 13, 13 (Fig. II), so as to be shiftable relative to one another to vary the relative positions of the cable runs. Also, distribution and reclamation may be carried on at the same time, by simply attaching properly arranged drags 7, 7 to the two cable runs concurrently.

Having thus described our invention, we claim:

1. Apparatus for distributing material over a storage area and reclaiming it, comprising separated material receiving and delivery stations, a drag with cable extending in a bight between said stations, and a guide for the cable bight shiftable around the storage area, so that the path of action of the scraper may be varied to cover the latter from both stations.

2. Apparatus for distributing material over a storage area and reclaiming it, comprising separated material receiving and delivery stations, guide means for a cable shiftable around the storage area, and a drag with operating cable extending between said stations and from each of them around said guide means.

3. A drag scraper storage system comprising a storage area with separated fixed marginal stations for receipt of material entering storage and delivery of material reclaimed from storage, with fixed guide means for the drag cable adjacent the aforesaid marginal stations, and guide means for a bight of cable from said fixed guide means arranged to travel around a portion of the storage area; so that the drag can take material from the receiving station and distribute it over the entire storage area, and can also take material from anywhere in the storage area and deliver it to the delivery station.

In testimony whereof, we have hereunto signed our names at Philadelphia, Pennsylvania this 3rd day of February, 1925.

ROBERT H. BEAUMONT.
WILLIAM E. HALE.